Figure 8:
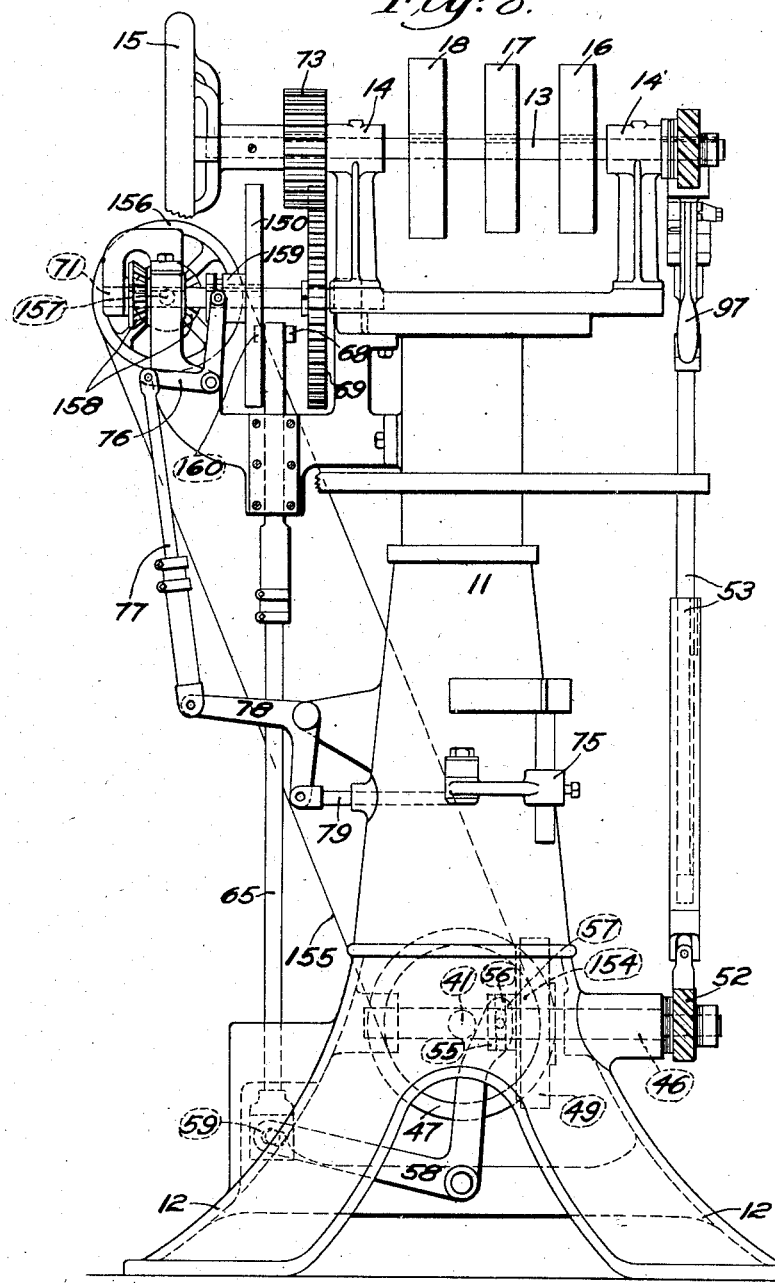

A. R. SCHOENKY.
MACHINE STOPPING AND STARTING MECHANISM.
APPLICATION FILED JAN. 19, 1914.
1,175,892.
Patented Mar. 14, 1916.
3 SHEETS—SHEET 1.
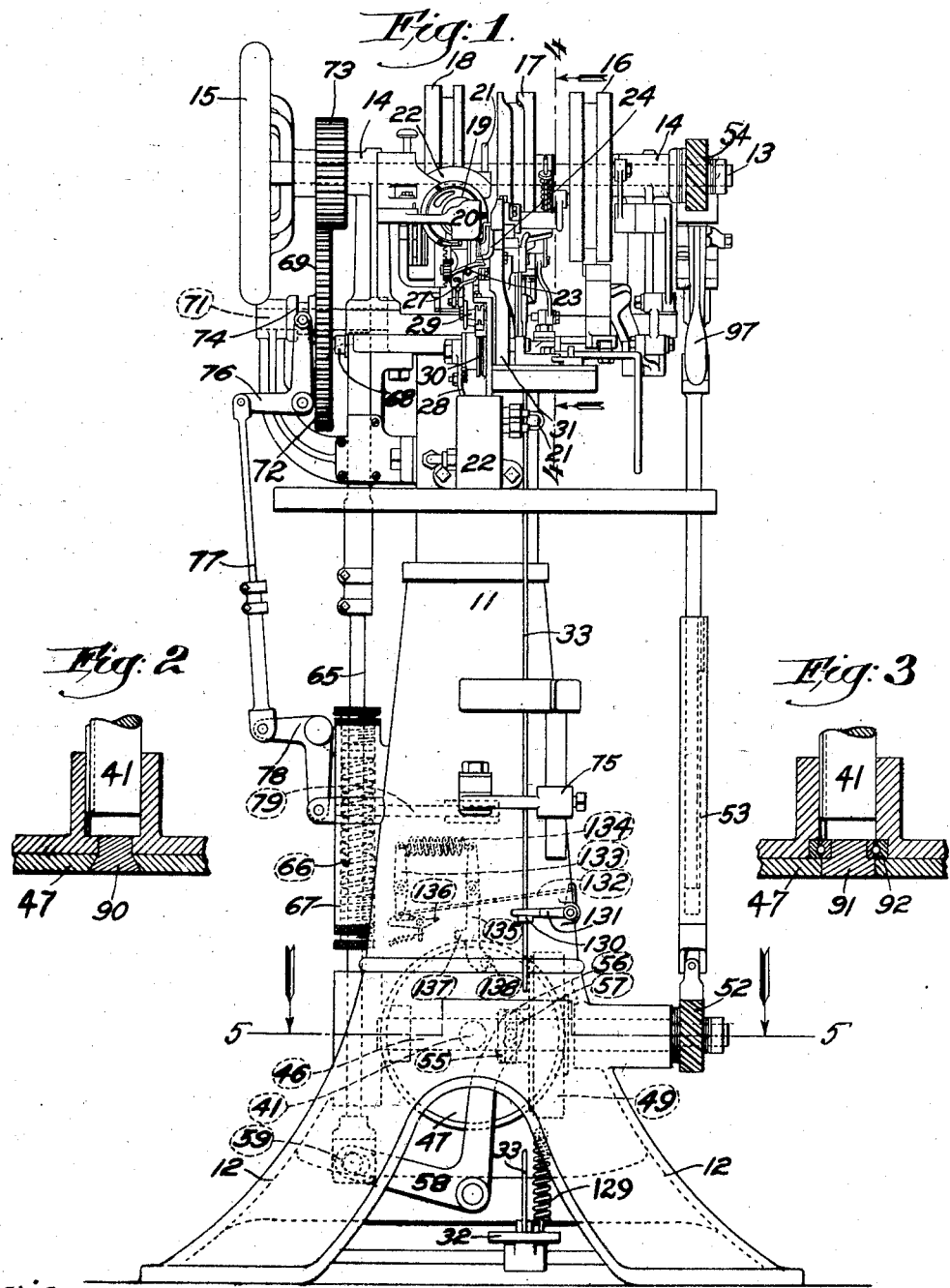

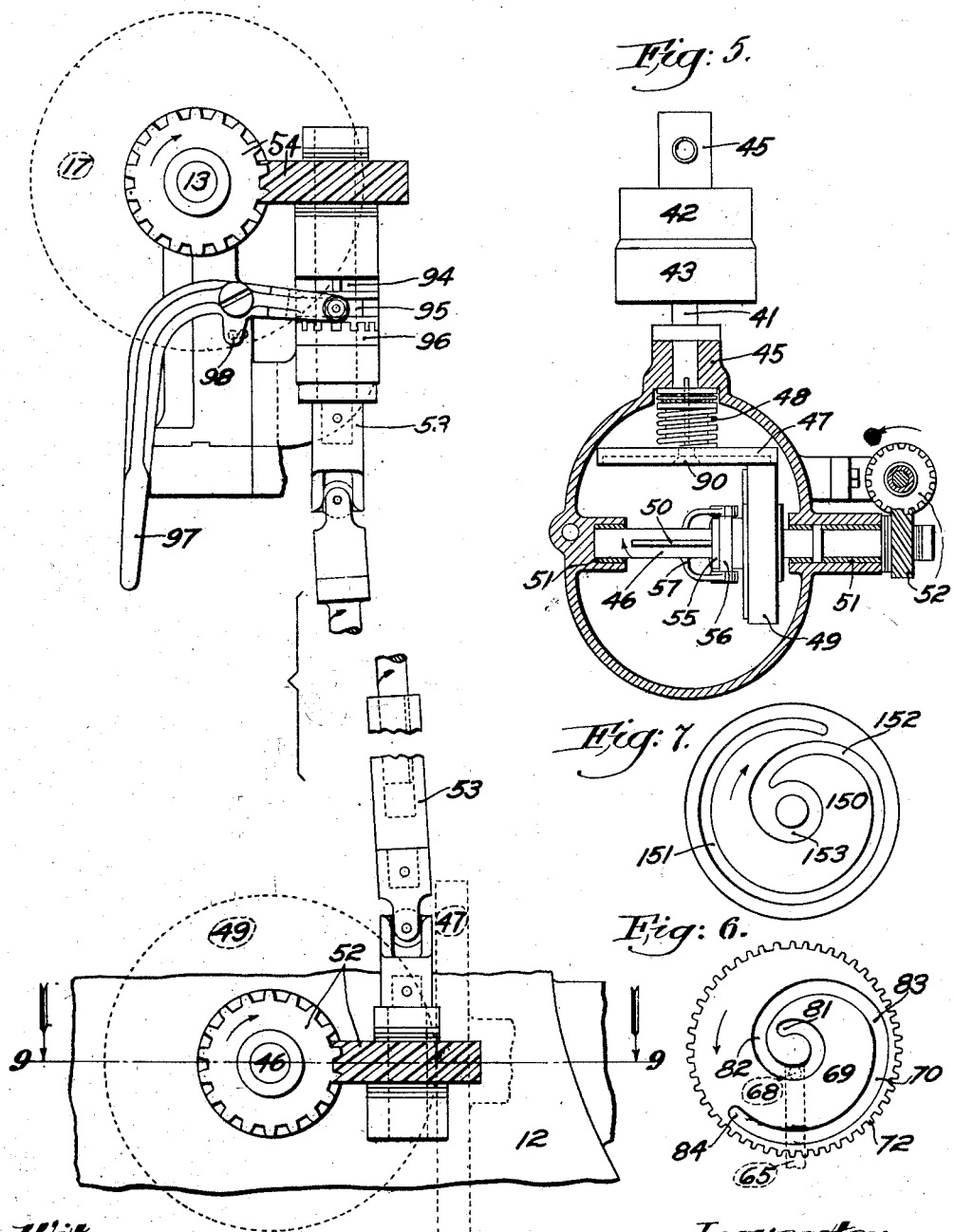

A. R. SCHOENKY.
MACHINE STOPPING AND STARTING MECHANISM.
APPLICATION FILED JAN. 19, 1914.

1,175,892.

Patented Mar. 14, 1916.
3 SHEETS—SHEET 3.

Witnesses,
Edward F. Allen.
M. Tucker

Inventor,
August R. Schoenky,
by Rogers, Kennedy & Campbell
his Attys.

UNITED STATES PATENT OFFICE.

AUGUST R. SCHOENKY, OF SOMERVILLE, MASSACHUSETTS, ASSIGNOR TO REECE SHOE MACHINERY COMPANY, OF BOSTON, MASSACHUSETTS, A CORPORATION OF MAINE.

MACHINE STOPPING AND STARTING MECHANISM.

1,175,892.   Specification of Letters Patent.   Patented Mar. 14, 1916.

Application filed January 19, 1914. Serial No. 812,956.

*To all whom it may concern:*

Be it known that I, AUGUST R. SCHOENKY, a citizen of the United States, residing at Somerville, in the county of Middlesex and State of Massachusetts, have invented certain new and useful Improvements in Machine Stopping and Starting Mechanism, of which the following is a specification, reference being had therein to the accompanying drawing.

This invention relates to machine stopping and starting mechanisms particularly for power operated machines such as sewing machines, and for convenience the same is illustrated in connection with a machine of the class employed in manufacturing shoes by the welt system whereby the outsole and welt are sewed together.

Reference is hereby made to prior Patent No. 1,085,093 granted Jan. 20, 1914, as illustrating or describing details which may be omitted or generally described herein; and the present application constitutes in certain respects a continuation of said prior patent.

The object hereof generally include the improvement of the mode of driving machines of various kinds; also the mode of starting a machine provided with the stopping devices of said prior application 746,164; and other objects hereof will be elucidated along with the description of the mechanism.

To the attainment of such objects and advantages the present invention consists in the novel features of combination, construction, arrangement and detail herein described and illustrated.

First will be described an illustrative form of machine in which the present improvements are embodied and thereafter the novel features will be pointed out in the appended claims.

In the accompanying drawings, forming a part hereof, Figure 1 is a front elevation of a sewing machine embodying the present improvements; Fig. 2 is a partial central cross-section of Fig. 1 at the central part of the driving friction disk; Fig. 3 is a cross-section similar to Fig. 2 of a modification; Fig. 4 is a right-hand elevation of some of the driving connections in Fig. 1, illustrating certain details on an enlarged scale; Fig. 5 is a horizontal section on the plane 5—5 of Fig. 1; Fig. 6 is a right face view of the stopping cam of Fig. 1; Fig. 7 shows a starting cam which may sometimes be employed instead of the starting spring shown in Fig. 1; Fig. 8 is a front view of a modified form of machine employing both the starting and stopping cams of Figs. 6 and 7.

Similar reference numerals refer to corresponding parts in the several figures of the drawings.

The details of a machine will now be described in which, after stoppage, the restarting of the machine is effected automatically under the operator's control, by means of a pressure storing device or spring in one case, and a cam in another case; and in which a continuously rotating cam is employed for automatically effecting a change in the driven shaft speed, namely, for increasing its speed from zero toward normal running speed; and in which the stoppage of the machine automatically effects the unlocking of the presser-foot and also the lifting thereof. Such a machine may have a vertical post 11 with base legs 12 and a head at the upper end in which a driven shaft 13, which may be termed the main shaft, is horizontally supported by bearings 14. A hand wheel 15 enables manual adjustment of the shaft, when necessary.

The operation of the stitching mechanism, including needle and co-acting parts, is effected from the main shaft 13, preferably by cams. Thus the disks 16, 17 and 18, rotating with the main shaft, contains the cams or grooves for effecting the various movements of the stitching parts. Some of the stitching parts will now be referred to and it will be understood that their cycle of operations may be similar to that of similar machines already known. In front of the shuttle 19 is seen a bobbin retainer 20. Steam pipes 21 convey steam to the boxes 22 for maintaining the waxed thread in proper condition. Above a fixed work-support 23 is a presser-foot 24 capable of up-and-down movement and adapted to be intermittently locked and unlocked upon the work in harmony with the stitching and feeding operations. The usual awl and needle and fittings therefor are shown, but not numbered. A looper 27 below the work is seen and also take-up lever 28, an auxiliary take-up 29, and the thread lock wheel 30. The feed slide 31 supports the awl fittings, and is adapted to be moved to right and left, so that the feed of the work may be effected while the awl is engaged therein. A treadle 32 is shown which, when depressed, may act through the rod 33 to lift the presser-foot 24, but, according to one branch of the present invention, the use of the treadle may be dispensed with, as the unlocking and lifting of the presser-foot are to be accomplished without manual or other attention from the operator.

The power for operating the machine is derived from the driving shaft or power shaft 41, arranged in the lower part of the machine and provided with loose and fast belt pulleys 42 and 43. Normally the belt will be on the fast pulley and the driving shaft running at a uniform speed. The driving shaft may be supported in bearings 45.

Intermediate the driving shaft 41 and the main shaft 13, or any other of the driven shafts, is interposed a variable speed transmitter. By this term is indicated a power transmitter, which, unlike a clutch, has not only full speed adjustment and zero or neutral adjustment, but also intermediate adjustments whereby the speed ratio between the shafts may be varied. For the purposes hereof it is highly preferably that the variable speed transmitter be capable of adjustment to all intermediate speeds; in other words, that it may be progressively adjusted from full speed to zero or reversely without disengagement, and maintaining the driving action with varying ratios throughout the adjustment. As an example of such progressively adjustable variable speed transmitter is shown a face friction gear, the fittings and details of which will now be described.

Between the driving power shaft 45 and the driven cross shaft 46 in front of the driving shaft are, a friction disk 47 rotating with the driving shaft and pressed forwardly by a spring 48, and a friction wheel 49, connected by spline 50 with the cross shaft, so that the face of the disk 47 presses against the periphery of the wheel 49. These two elements, the disk and the wheel, will be properly surfaced with metal and fiber compositions. The adjustment of the wheel 49 across the face of the disk varies the speed ratio. In Fig. 1 the wheel is at the right-hand edge of the disk and the machine is being driven at full speed. An adjustment of the wheel toward the center of the disk reduces the speed ratio until, when the wheel reaches the zero or neutral position, the driving action ceases and the machine comes to rest.

The cross shaft is journaled in bearings 51. A pair of helical gears 52 transmits the rotation to a vertical shaft or rod 53 which, in turn, is connected by a second helical gear 54 with the horizontal driven shaft 13. For adjustment of the friction wheel it is provided with a collar 55 engaging a sleeve or ring 56, to which is pivoted a yoke 57 formed on one arm of a bell crank 58, having at its other arm a slotted connection 59 with a vertical rod 65. Thereby the vertical movements of the rod effect the adjustment of the friction wheel.

Herein the stoppage of the machine is shown as effected by connections from the driven shaft 13 to the transmitter, which are so arranged that the driven shaft thereby effects its own stoppage in the manner explained in said prior application 746,164. These connections operate through the rod 65, whose downward movement is resisted by a spring 66 confined in barrel 67. At the upper end of the rod is a cam follower 68 adapted to be engaged with and disengaged from the stop cam 69, or rather the groove 70 thereof, whose details are more clearly seen in Fig. 6. In order to effect such engagement and disengagement, the stop cam 69 is made axially adjustable or loose upon shaft 71, so that it can be moved toward the follower to engage the two or from the follower to disengage. The disk 69 is provided with peripheral teeth 72 engaging with a gear 73 fast on the main shaft 13. With this arrangement, if the cam and follower be engaged, the rotation of the cam forces the follower and the rod 65 downward, so as to readjust the transmitter 47, 49, to zero or stop position. In this way connections are provided from the driven shaft to the transmitter of a nature which may be rendered operative or inoperative at suitable times. Preferably the control of these connections is effected at will, so that the operator may connect the connections and thereby cause the machine to effect its own stoppage. To this end the cam disk 69 may be attached to a grooved collar 74 connected by a train of mechanism with a lever, such as a knee lever 75, which may be thrown at will to shift the disk as explained. For example, the collar 74 may be actuated by a bell crank 76 connected by a rod 77 with a second bell crank 78, which, in turn, is connected by a sliding link 79 with the knee lever.

Referring more particularly to the stopping cam 70, it is shown as concentric from its inner end 81 to the point 82, thus facilitating the entry of the follower into the groove. The groove is of spiral or eccentric form from the point 82 to the point 83, constituting about a half revolution of the cam which corresponds with a full revolution of the main shaft 13, so that the stopping will be effected during the formation of one stitch. After the point 83, the groove may be concentrically extended to the point 84.

When the friction wheel is adjusted to the center of the disk and the machine is inoperative, there is a certain injurious friction between the disk and wheel, and I have devised expedients to obviate destructive wear. Thus, in Fig. 2, a frictionless center 90 to the friction disk 47 is provided. This may, for example, be of polished steel, between which and the fiber periphery of wheel 49 there is but slight friction, or, according to Fig. 3, the center block 91 of the friction disk may be connected by ball bearings 92 to permit the block to remain stationary when the disk is rotating.

To permit the driven shaft 13 to be disconnected so that it may be turned by hand when desired, the following clutch arrangement may conveniently be employed. The upright rod or shaft 53 may have its uppermost section 94 separately formed, so that, by providing a clutch member 95 on the shaft portion 94 and a clutch 96 on the lower part of the shaft 53, the two may be coupled or uncoupled. A clutch handle 97 may be provided for lifting and depressing the clutch part 95 to disengage and engage the clutch part 96, and a locking device 98 may be employed for securing the parts in either position.

The presser-foot 24 consists of a forwardly extending pivoted arm and is slightly spring pressed upon the work, and, as usual, is also intermittently locked with forcible pressure upon the work and released to permit feeding. The details of the pressing and locking devices are not illustrated or described in detail as they *per se* form no part of the present invention. It is sometimes desirable to unlock the presser foot while under full pressure, for example, so as to permit the presser-foot to be lifted. The downwardly extending rod 33 may be so connected at its upper end to the presser foot mechanism that, when depressed, it serves to first unlock the presser-foot and then lift it. The details of such connection are not shown but may be of any desired construction, for example, as shown in my prior Patent No. 1,071,355, granted August 26th, 1913, wherein the depression of the pedal rod $t^2$ effects first the unlocking and then the lifting of the presser foot; or they may be as shown in my co-pending application Serial No. 771,000½, filed May 31st, 1913, patent to be granted February 15th, 1916, wherein the pedal rod 86, when pulled down, gives the same action. In the present machine, however, rather than employing a pedal for depressing the rod 33 the purpose is accomplished automatically by the running parts of the machine and without attention. This will preferably be done simultaneously with the stoppage of the machine and by reason of the movement of the stopping devices.

The following is a convenient mechanism for accomplishing the purpose. The rod 33 is pressed up by a spring 129. A collar 130 on the rod 33 (see Fig. 1) contacts the under side of a bell crank 131 whose upright arm is connected by link 132 with the lower end of a short upright lever 133 centrally pivoted and connected at its upper end to a spring 134 tending to pull the lever to the right. A lever 135 also centrally pivoted, has its upper end connected to the spring 134 for tensioning the spring at proper times. The parts are shown in running position in which the lower end of lever 133 is engaged in the notch of a small latch or trigger 136 and so held against the pulling of spring 134. The lower end of lever 135 is provided with a shoe 137 adapted to strike the trigger 136. When the lever 135 is swung to the left it first stretches the spring 134 and then throws the trigger so as to release the lever 133 which is swung under the influence of the spring to pull the link 132 thereby causing the depression of the rod 33. It will be understood that the spring 134 is of such strength as to overcome the spring 129.

It is preferred to govern the action of the described parts through the transmitter adjusting connections. Thus lever 135 is provided with a stud or follower 138 so located that when the friction wheel 49 of the transmitter is adjusted from the full speed position of Fig. 1 to the neutral or zero position it strikes the roller, swings the lever and effects the down-pulling of the rod 33 as described. The restoration of the parts is effected by the spring 129 which resets the levers and trigger. The described presser-foot operating mechanism is not herein made the subject of claim.

For restarting the machine is preferred an automatically acting device actuated directly or indirectly from one of the shafts and serving to adjust the variable speed transmitter from its zero to full speed adjustment. For example, the spring 66 before referred to, is an automatically acting device which enables the driven shaft to indirectly effect a restarting. This spring, moreover, coöperates with the natural resistance of the variable speed transmitter to adjustment, to retard or oppose the motion of the driven parts during stoppage and thus consume some of the momentum thereof. By the stoppage of the machine, as before described, the spring is put under pressure. When released, that is to say when the connections between the driven shaft 13 and the transmitter are rendered inoperative by the separation of cam 69 and follower 68, the spring 66 reasserts itself to lift the rod 65 and thereby shift the friction wheel 49 from zero to full speed position. This shifting is not sudden but is gradual, the wheel creeping across the disk as the rotation of the latter permits, and thereby an easy and effective starting is afforded.

In Figs. 7 and 8 is shown a continuously running device, namely: the rotary cam 150 which, under proper control, is able to adjust the variable speed transmitter to change the speed of the driven shaft 13. For example, the cam 150 may be used in lieu of the spring 66 of Fig. 1 for restarting the machine after stoppage. The cam groove has a concentric first portion 151 near the periphery facilitating the engagement with its follower. This is followed by an eccentric portion 152 and finally an annular groove 153 terminates the cam. This will be seen to be the reverse of the stopping cam (Fig. 6) which begins near the center and ends near the periphery so as to force the follower 68 down. The starting cam 150 lifts the follower.

In order to continuously drive the cam 150 from the driving shaft, a pulley 154 is indicated connected by a belt 155 with a pulley 156 on a short shaft 157 connected by bevel gears 158 with the shaft 71 supporting the starting cam 150. The shaft 71, in this case unlike Fig. 1, is axially movable, carrying with it the stopping cam 69 which is loose on the shaft, and the starting cam 150 which is fast on the shaft. The groove collar 159 on the shaft is engaged by the bell crank 76 and other connections to the knee lever 75 as before. The rod 65 has not only the follower 68 for engaging cam 69, but follower 160 for engaging cam 150.

As shown in Fig. 8, the machine is running full speed, the follower 160 engaging the annular portion 153 of the starting cam while the stopping cam is disengaged. Upon swinging the knee lever to shift the shaft 71 bodily to the left (there being a spline between it and bevel gear 158) the starting cam will be disengaged and the stopping cam engaged by its follower, which depresses the rod 65 and effects the machine's stoppage. Upon a reverse movement of the knee lever, the starting cam engages its follower, lifting the rod and restarting the machine.

In order to adjust the head of the machine in height it is made movable relatively to the base by a telescoping supporting post 11. In combination with this feature the rotating rod 53, the sliding rod 65 and the connecting link 77 are made adjustable in length so that they may be altered to suit the adjustment of the supporting post.

While two species of restarting mechanisms are shown, namely, restarting by a spring or similar device put under pressure during the stopping as in Fig. 1, and restarting by mechanical connections from the driving shaft or other constantly running part, no claim is herein made for the latter species as the same is made the subject of claim in my co-pending applications, Serial No. 823,330, filed March 9th, 1914, and Serial No. 836,593, filed May 6th, 1914. Likewise the presser-foot control mechanism shown herein is not herein made the subject of claim. Likewise the means for uncoupling the driven shaft or the variable speed transmitter is not claimed herein but is made the subject of claim in applicant's copending application Serial No. 861,001, filed September 10th, 1914.

It will thus be seen that there has been described a sewing machine embodying the improvements and attaining the objects and advantages above recited, and other advantages therein will be apparent to those skilled in the art. Since many matters of design, arrangement, detail and other features may be variously altered without departing from the invention, no limitation to such features is intended excepting so far as specified in the appended claims.

What is claimed is:

1. In a power-operated machine the combination of a driving shaft, a driven shaft, a variable speed transmitter between said shafts, the same adjustable to zero for effecting stoppage of the driven shaft, and means deriving its power by actuation from one of said shafts and adapted to adjust the transmitter from zero position to restart the driven shaft after such stoppage.

2. In a power-operated machine, the combination of a driving shaft, a driven shaft, a variable speed transmitter between said shafts, and a pressure-storing device or spring set by the act of stopping of the driven shaft and adapted when released to adjust the transmitter from zero position to restart the driven shaft after stoppage.

3. A machine speed changing mechanism including in combination, a driver, a driven member, a variable speed transmitter between said driver and driven member, a pressure-storing device or spring, means whereby a running part operates said device, and means whereby said device may effect the adjustment of the transmitter to change the speed ratio.

4. A machine speed changing mechanism including in combination, a driver, a driven member, a variable speed transmitter between said driver and driven member, a pressure-storing device or spring, means whereby a running part operates said device, and means whereby said device may effect the adjustment of the transmitter to start the driven member.

5. A machine speed changing mechanism including in combination, a driver, a driven member, a variable speed transmitter between said driver and driven member, connections between said driven member and said transmitter whereby adjustment of the transmitter to zero position may be automatically effected, said connections being normally inoperative during the running of the machine, a controller for rendering said connections operative at suitable times whereby the driven member is caused to bring about its own stoppage, and means for adjusting said transmitter from zero to restart the driven member comprising a pressure storing device (e. g. spring or piston) which is set by the action of adjusting the transmitter toward zero, whereby the driven member is automatically restarted on rendering the said connections inoperative 6. For a power operated machine the combination of driving means, a stopping means, a control lever adapted to be shifted in either direction by a mere pushing action of the operator between its stopping position and its restarting position, and connections from said lever to said driving means and said stopping means whereby, when the lever is shifted to stopping position, it brings about an adjustment which causes the stopping means to stop the machine and, when shifted to restarting position, it brings about an adjustment which causes the driving means to drive the machine, said lever so fitted as to remain in either position without the attention or exertion of the operator.

7. For a power operated machine the combination of driving means, a stopping means, a control lever adapted to be shifted horizontally in either direction by a mere pushing action of the operator's leg between its stopping position and its restarting position, and connections from said lever to said driving means and said stopping means whereby, when the lever is shifted to stopping position, it brings about an adjustment which causes the stopping means to stop the machine and, when shifted to restarting position, it brings about an adjustment which causes the driving means to drive the machine, said lever so fitted as to remain in either position without the attention or exertion of the operator.

8. For a power operated machine the combination of driving means, a stopping means adapted when put in operation to automatically stop the machine at a predetermined point in its rotation or cycle, a control lever adapted to be shifted in either direction by a mere pushing action of the operator between its stopping position and its restarting position, and connections from said lever to said driving means and said stopping means whereby, when the lever is shifted to stopping position, it brings about an adjustment which causes the stopping means to stop the machine and, when shifted to restarting position, it brings about an adjustment which causes the driving means to drive the machine, said lever so fitted as to remain in either position without the attention or exertion of the operator.

9. A driving mechanism for power operated machines, including in combination, a driver, a driven member, a variable speed transmitter between said driver and driven member, the same adjustable to zero for effecting the stoppage of the driven member, and automatic means adapted to effect the adjustment of the transmitter to restart the driven member after such stoppage thereof.

In testimony whereof I affix my signature in presence of two witnesses.

AUGUST R. SCHOENKY.

Witnesses:
F. A. SHEA,
JOHN C. BURNS.

Copies of this patent may be obtained for five cents each, by addressing the "Commissioner of Patents, Washington, D. C."